May 27, 1969 K. R. SKINNER ET AL 3,447,130
MOTOR VEHICLE SIGNALING SYSTEM
Filed Nov. 8, 1965

INVENTORS
Kenneth R. Skinner &
Monte L. Vickery
Albert F. Duke
ATTORNEY

United States Patent Office 3,447,130
Patented May 27, 1969

3,447,130
MOTOR VEHICLE SIGNALING SYSTEM
Kenneth R. Skinner and Monte L. Vickery, Anderson, Ind., assignors to General Motors Corporation, Detroit, Mich., a corporation of Delaware
Filed Nov. 8, 1965, Ser. No. 506,731
Int. Cl. B60q 1/52
U.S. Cl. 340—80                4 Claims

ABSTRACT OF THE DISCLOSURE

A motor vehicle signaling system is disclosed which includes a flasher provided with a load sensitive output terminal and a non-load sensitive output terminal. A turn signal switch is adapted to connect either of two pairs of signal lamps to the load sensitive output terminal of the flasher while an emergency warning switch is actuable in combination with the turn signal switch to connect the other pair of signal lamps with the nonload sensitive output terminal of the flasher permitting the simultaneous flashing of all signal lamps as an emergency warning signal.

---

This invention relates to a signaling system for motor vehicles and more particularly to a system utilizing a single flasher for flashing the vehicle signal lamp during turn signaling or emergency warning operation.

Present automobiles are provided with exteriorly mounted signal lamps located at the front and rear of the vehicle on the left and right hand sides of the vehicle. A turn signal switch is provided for selectively connecting either the left or right signal lamps to a flasher for intermittently energizing the selected lamps. One type of flasher presently used is the series type thermomotive flasher in which an operating element is connected in series with the flasher load. As the current flows through the operating element to the load, the operating element heats and expands and eventually opens the load circuit with a snap action and extinguishes the signal lamps. The operating element thereupon cools and contracts and after a predetermined contraction, recloses the circuit to the load.

A flasher such as described above is load sensitive. In other words its flashing rate is dependent on the amount of load current flowing through the operating element. Generally, the flasher is designed to operate the signal lamps on one side of the vehicle at a time. If one of the signal lamps burns out, the usual indicator lamp will not flash thereby providing an indication to the driver of the vehicle of lamp burnout.

There are numerous situations in which it is desirable to flash the signal lamps on both sides of the vehicle simultaneously such as, for example, when the vehicle is pulled to the side of a road for repairs. One prior art arrangement of merely connecting all the signal lamps to an additional flasher designed to carry the increased load represents a substantial increase in cost. While arrangements have been proposed whereby a single flasher designed to flash the signal lamps on one side of the vehicle may be used to flash the lamps on both sides of the vehicle by closing one circuit when the operating element of the flasher contracts and a second circuit when the operating element expands, these proposals have not been entirely satisfactory inasmuch as burnout of one of the signal lamps renders the system inoperative pending replacement of the lamp.

In accordance with the present invention, a signaling system is provided including a flasher having a first output terminal connected through the turn signal switch to the signal lamps on one side of the vehicle and a second output terminal connectable through an emergency warning switch and the turn signal switch to the signal lamps on the other side of the vehicle so that operation of both the turn signal switch and the emergency warning switch will provide flashing of all of the signal lamps of the vehicle. The signal lamp load connected to the first output of the flasher thus remains the same during both turn signaling and emergency warning operation. By requiring operation of the turn signal switch, the load sensitive feature of the flasher is retained to indicate lamp burnout while permitting emergency warning operation through reversal of the turn signal switch position without requiring immediate replacement of a burned out lamp.

A more complete understanding of the present invention may be had from the following detailed description which should be read in conjunction with the drawings in which.

Figures 1, 2:
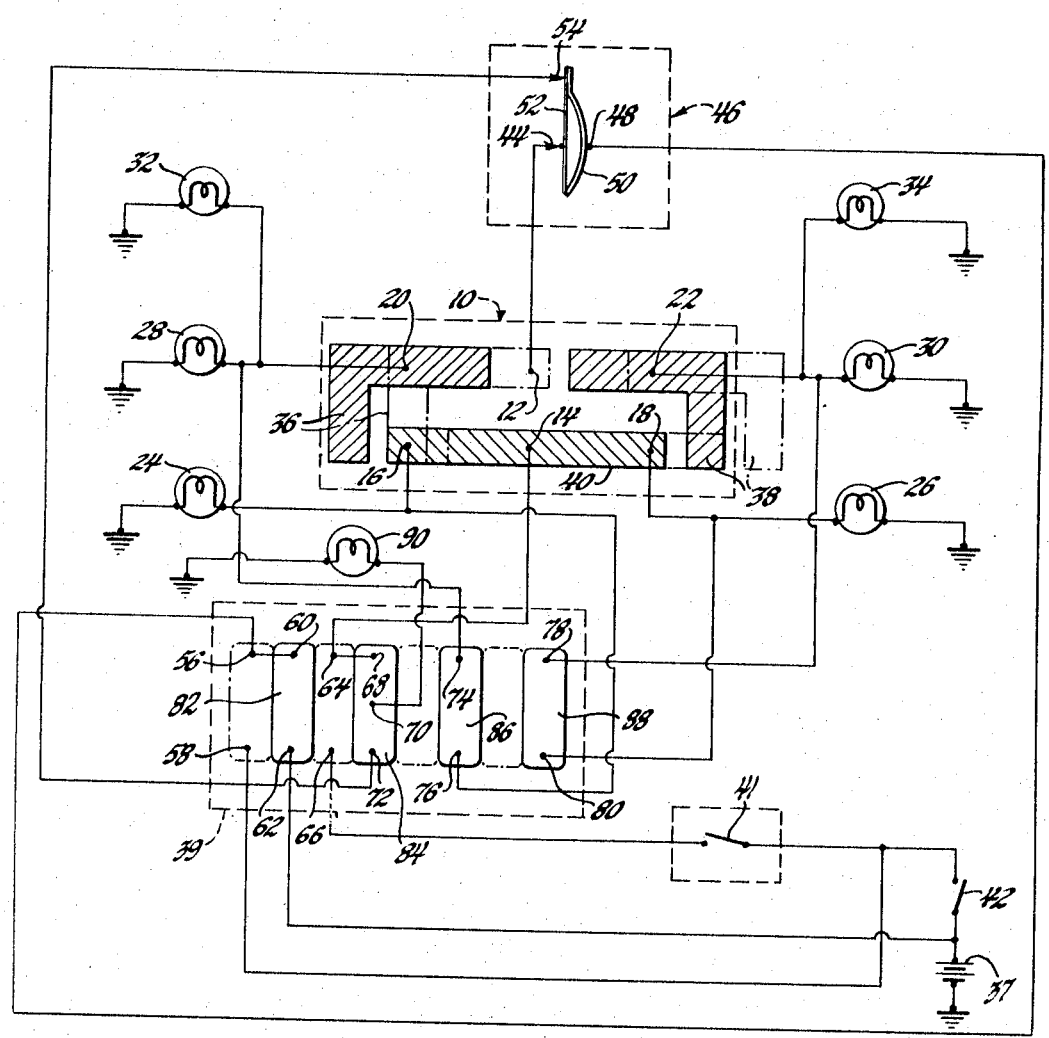
FIGURE 1 is a schematic diagram of the signaling system of the present invention.
FIGURE 2 is a schematic illustration of the operation of the flasher of the present system.

Referring now to FIGURE 1, a turn signal switch generally designated 10 comprises input terminals 12 and 14 and output terminals 16–22 connected respectively to a left rear signal lamp 24, a right rear signal lamp 26, a left front signal lamp 28 and a right front signal lamp 30. In addition indicator lamps 32 and 34 are connected to the output terminals 20 and 22 respectively. The switch 10 also includes bridging contacts 36, 38 and 40 movable in response to operation of a turn signal actuator (not shown). The input terminal 14 is connected to a source of voltage such as the vehicle battery 37 through an emergency warning switch generally designated 39, a brake switch 41 and an ignition switch 42.

The input terminal 12 of the turn signal switch 10 is connected to one output terminal 44 of a flasher generally designated 46. An input terminal 48 of the flasher 46 is connected to the battery 37 through the ignition switch 42 and the emergency warning switch 39 when in an off position. The flasher 46 comprises an electrically conductive metal vane 50 to which is attached a pull ribbon 52 of electrically conductive thermally expansible metal whose resistance is such that the current drawn by either the signal lamps 24 and 28 or 26 and 30 is sufficient to elevate the temperature thereof by a substantial amount. In addition to the output terminal 44 which normally engages the pull ribbon 52, the flasher 46 includes an output terminal 54 which normally engages the metal vane 50. In order to initiate snap action of the flasher 46, the turn signal switch 10 must be actuated for either a left of right turn in which instance either the signal lamps 24 and 28 or the signal lamps 26 and 30 are connected to the source 37 through the ribbon 52 and the metal vane 50. Current flow through the ribbon 52 causes expansion thereof and consequent disconnection of the source 37 from the output terminals 44 and 54. After a time interval allowing the ribbon 52 to cool, the terminals 44 and 54 are once again connected to the source 37 thereby providing an intermittent output voltage. This operation is illustrated in FIGURE 2 wherein the arrows indicate current flow through the flasher. While the flashing rate of the flasher 46 is dependent on the current flow through the ribbon 52, it will be apparent that since the output terminal 54 is not connected to the ribbon 52 but rather the metal vane 50, the flashing rate of the flasher 46 is independent of the load on the output terminal 54. The significance of this arrangement will be more apparent hereinafter during the discussion of the mode of operation of the present invention resulting from the interconnection of the emergency warning switch 39 and the turn signal switch 10 and the effect of lamp burnout on the operation of the system.

The emergency warning switch 39 as schematically illustrated, includes a plurality of stationary contacts 56–80 and movable contacts 82–88. The stationary terminals 56 and 60 are connected together to the input terminal 48 of the flasher 46. The terminal 58 is connected to the battery 37 through the ignition switch 42 and the terminal 62 is connected directly to the battery 37. The terminals 64 and 68 are connected together and to the input terminal 12 of the turn signal switch 10. The terminal 66 is connected to the battery 37 through the brake switch 41 and the ignition switch 42, while the terminal 72 is connected to the output terminal 54 of the flasher 46. The terminals 74 and 76 are connected to the terminals 20 and 16 respectively while the terminals 78 and 80 are connected to the terminals 22 and 18 respectively. The terminal 70 is connected to an indicator lamp 90.

*Operation*

When the emergency warning switch 39 is in the off position, the movable contacts 82–88 are in the position shown in dotted line. Under these conditions, the output terminal 54 of the flasher 46 is disconnected from the input terminal 14 of the turn signal switch 10. If it is desired to make a left hand turn, the movable contacts 36, 38 and 40 are moved to the dotted-line position wherein the signal lamps 24 and 28 are connected through the output terminals 16 and 20 to the input terminal 12 of the turn signal switch 10. The signal lamps 24 and 28 will be immediately energized from the source through the input terminal 48 and the output terminal 44 of the flasher 46. Current flow through the ribbon 52 will cause it to expand disconnecting the terminal 44 from the ribbon 52 and extinguishing the signal lamps 24 and 28. After a time interval, the ribbon 52 will contract and re-engage the contact 44. Thus, the signal lamps 24 and 28 are intermittently energized. If the brakes are applied while a turn is being made, the lamp 26 is energized from the battery through the brake switch 41, the stationary terminals 64 and 66 and the movable contact 84 of the emergency warning switch 38, the input terminal 14, the output terminal 18 and the movable contact 40 of the turn signal switch 10 to apply a constant energization to the lamp 26. If either of the signaling lamps 24 or 28 should burn out, the current flow through the ribbon 52 will decrease to an amount insufficient to cause snap action operation of the flasher 46 and thus the turn indicator lamp 32 will not flash but remain constantly energized indicating to the driver of the vehicle that one of the lamps is burned out. Similar operation is obtained when it is desired to indicate a right hand turn.

When it is desired to indicate an emergency condition such as when the vehicle is pulled off to the side of the road, the emergency warning switch 39 is moved to the full line position wherein the contacts 60, 62; 68, 72; 74, 76; 78, 80 are bridged by the contacts 82, 84, 86 and 88 respectively. Under these conditions, battery voltage is applied directly to the input terminal 48 of the flasher 46 through the contact 82. The output terminal 54 of the flasher 46 is connected to the input terminal 14 of the turn signal switch through the movable contact 84. The signal lamps 24 and 28 are both connected to the output terminal 16 of the turn signal switch 10 through the contacts 86 and the signal lamps 26 and 30 are both connected to the output terminal 18 of the turn signal switch 10 through the movable contact 88. However, when the turn signal switch 10 is in the neutral position, the output terminals 16–22 are disconnected from the output terminal 44 of the flasher. Thus, no current flows through the ribbon 52 and none of the lamps are intermittently flashed. In order to simultaneously flash all of the signal lamps 24–30, the turn signal switch 10 is moved to either the left or right turn indicating position, either position being sufficient to connect the lamps on one side of the vehicle to the output terminal 44 and initiate current flow through the ribbon 52. If, for example, the turn signal switch is moved to the left turn indicating position as shown in the schematic in dotted line, current flow to the lamps 24 and 28 will initiate snap action of the flasher 46, thus alternately connecting the source 37 to the output terminals 44 and 54. Thus battery voltage is intermittently applied to the input terminal 12 of the turn signal switch 10. As noted in the schematic, when the turn signal switch 10 is in the left hand turn indicating position, the output terminal 16 is disconnected from the input terminal 14 while the output terminal 18 remains connected thereto. Consequently, battery voltage is intermittently applied from the output terminal 54 of flasher 46 to the right hand signaling lamps 26 and 30 through the output terminal 18 and the movable contact 88. The current flow to the lamps 26 and 30, however, is not through the ribbon 52 but rather through the metal vane 50. Thus the ribbon 52 is only required to carry the normal load existing during turn signal operation for which the flasher 46 has been designed. The intermittent voltage appearing at the output terminal 54 is also applied to the indicating lamp 90 through the movable contact 84 and the contact 70 when the emergency warning switch is in the on position.

It is important to note that in the present invention should a signal lamp burn out on the left hand side of the car, the inoperativeness of the flasher 46 resulting therefrom may be easily corrected by shifting the turn signal switch 10 to the right turn indicating position in which case all operative signal lamps will again flash. The signal lamp 90 will be constantly energized should one of the lamps burn out thereby indicating to the driver that the system is not operating properly after which the aforementioned change in position of the turn signal switch may be initiated.

We claim:

1. A motor vehicle signaling system comprising a source of direct current, first and second pairs of signal lamps, a thermomotive flasher including a snap action member, a heat responsive element carried by said snap action member for controlling the movement of said member between a closed and an open circuit position in response to current flow through said element, means connecting said source to said member, a first stationary contact engagable by said element in said closed position, a second stationary contact engageable by said member in said closed position, normally open emergency warning switch means connected to said second stationary contact, turn signal switch means including contact means actuable to connect either of said pairs of lamps to said first stationary contact and to connect the other set of lamps to said second stationary contact through said emergency warning switch means whereby one set of lamps is flashed at a predetermined rate upon actuation of said turn signal switch means and both sets of lamps are flashed at said predetermined rate upon concurrent closure of said turn signal and said emergency warning switch means.

2. A motor vehicle signaling system comprising a source of direct current, first and second pairs of signal lamps, a thermomotive flasher including an electrically conductive metal vane biased toward a first position, an electrically conductive expansible element attached at its ends to said metal vane and normally maintaining said vane in a second position, said element permitting said vane to move to said first position in response to current flow therethrough for a predetermined interval of time, input contact means connecting said source to said metal vane, first output contact means engageable by said expansible element when said vane is in said second position to complete a current path between said input contact means and said first output contact means through said metal vane and said expansible element, second output contact means engageable by said metal vane in said second position to complete a current path between said input contact means and said second output contact means through said metal vane independently of said expansible element, normally open emergency warning switch means connected to said second output contact means, turn signal switch means including contact means actuable to connect either of said pair of lamps to said first output contact means and to connect the other set of lamps to said second output contact means through said emergency warning switch means whereby one set of lamps is flashed at a predetermined rate upon actuation of said turn signal switch means and both sets of lamps are flashed at said predetermined rate upon concurrent closure of said turn signal and said emergency warning switch means.

3. The system defined in claim 2 further including first an dsecond indicator lamps connected in parallel with said first and second pairs of signal lamps, respectively, an emergency warning indicator lamp, said emergency warning switch means being adapted when closed to connect said emergency warning indicator lamp to said second output terminal.

4. The system defined in claim 3 further including an ignition switch connected between said source and said input contact means of said flasher, said emergency warning switch means being adapted when closed to shunt said ignition switch to connect said source directly to said input contact means.

References Cited
UNITED STATES PATENTS

| | | | |
|---|---|---|---|
| 3,206,723 | 9/1965 | Doane | 340—76 |
| 3,328,636 | 6/1967 | Siiberg | 340—81 X |
| 3,333,149 | 7/1967 | Siiberg | 340—80 X |
| 3,349,280 | 10/1967 | Siiberg | 340—79 X |

JOHN W. CALDWELL, *Primary Examiner.*

KENNETH N. LEIMER, *Assistant Examiner.*

U.S. Cl. X.R.

337—138; 340—67, 81, 251